(12) United States Patent
Tjahjadi et al.

(10) Patent No.: US 11,272,125 B2
(45) Date of Patent: Mar. 8, 2022

(54) SYSTEMS AND METHODS FOR AUTOMATIC DETECTION AND INSETTING OF DIGITAL STREAMS INTO A VIDEO

(71) Applicant: FUJIFILM Business Innovation Corp., Tokyo (JP)

(72) Inventors: Yulius Tjahjadi, San Mateo, CA (US); Donald Kimber, Foster City, CA (US); Qiong Liu, Cupertino, CA (US); Laurent Denoue, Verona (IT)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/129,258

(22) Filed: Dec. 21, 2020

(65) Prior Publication Data
US 2021/0112209 A1    Apr. 15, 2021

Related U.S. Application Data

(63) Continuation of application No. 16/031,068, filed on Jul. 10, 2018, now Pat. No. 10,873,709.

(51) Int. Cl.
*H04N 5/272* (2006.01)
*H04N 5/232* (2006.01)

(52) U.S. Cl.
CPC ......... *H04N 5/272* (2013.01); *H04N 5/23238* (2013.01)

(58) Field of Classification Search
CPC ........................... H04N 5/272; H04N 5/23238
USPC ....................................................... 348/36
See application file for complete search history.

(56) References Cited

U.S. PATENT DOCUMENTS

| | | |
|---|---|---|
| 2002/0180759 A1 | 12/2002 | Park et al. |
| 2018/0270417 A1 | 9/2018 | Suitoh et al. |
| 2019/0028642 A1* | 1/2019 | Fujita .................. H04N 5/2723 |
| 2019/0335115 A1 | 10/2019 | Kumai |
| 2019/0347760 A1* | 11/2019 | Takahashi ............. G06T 3/0087 |

(Continued)

OTHER PUBLICATIONS

Baudisch, P., et al., Focus Plus Context Screens: Combining Display Technology with Visualization Techniques, Proceedings of the 14th Annual ACM Symposium on User interface software and technology, ACM, 2001.

(Continued)

*Primary Examiner* — Jae N Noh
(74) *Attorney, Agent, or Firm* — Procopio, Cory, Hargreaves & Savitch LLP

(57) ABSTRACT

Systems and methods for automatic detection and insetting of digital streams into a video. Various examples of such regions of interest to the user include, without limitation, content displayed on various electronic displays or written on electronic paper (electronic ink), content projected on various surfaces using electronic projectors, content of paper documents appearing in the video and/or content written on white (black) boards inside the video. For some content, such as whiteboards, paper documents or paintings in a museum, a participant (or curator) could have taken pictures of the regions, again stored digitally somewhere and available for download. These digital streams with content of interest to the user are obtained and then inset onto the view generated from the raw video feed, giving users the ability to view them at their native high resolution.

20 Claims, 4 Drawing Sheets

(56) References Cited

U.S. PATENT DOCUMENTS

2019/0364225 A1  11/2019  Takanashi

OTHER PUBLICATIONS

Liu, Q., et al., FLYSPEC: A Multi-User Video Camera System with Hybrid Human and Automatic Control, Proceedings of the Tenth ACM international Conference on Multimedia, ACM, 2002.
Foote, J., et al., Reach-Through-The-Screen: A New Metaphor for Remote Collaboration, Pacific-Rim Conference on Multimedia, Springer, Heidelberg, 2004.
Erol, B. et al., Linking Multimedia Presentations with Their Symbolic Source Documents: Algorithm and Applications, Proceedings of the Eleventh ACM international conference on Multimedia, ACM, 2003.
He, K., et al., Mask r-cnn, Computer Vision {ICCV}, 2017 IEEE International Conference on IEEE, 2017.

* cited by examiner

SYSTEMS AND METHODS FOR AUTOMATIC DETECTION AND INSETTING OF DIGITAL STREAMS INTO A VIDEO

CROSS-REFERENCE TO RELATED APPLICATIONS

This application claims priority to U.S. patent application Ser. No. 16/031,068, filed Jul. 10, 2086, the contents of which are incorporated herein by reference.

BACKGROUND OF THE INVENTION

Technical Field

The disclosed embodiments relate in general to augmented videos systems and methods and, more specifically, systems and methods for automatic detection and insetting of digital streams into a 360-degree video.

Description of the Related Art 360-degree videos, also known as immersive videos or spherical videos, are video recordings where a view in every direction is recorded at the same time, acquired using an omnidirectional camera or a collection of multiple cameras pointed in different directions. During the playback of the 360-degree videos on a conventional flat display, the viewer may be provided control of the viewing direction like a panorama. The 360-degree videos can also be played on a displays or projectors arranged in a cylinder or some part of a sphere. The aforesaid 360-degree videos are a remarkable improvement for remotely joining meetings or other group gatherings such as trade shows, museums, and art exhibitions, because they provide remote viewers with full control over what they can watch.

However, one downside of this technology is that the 360-degree videos poorly image some regions that contain high-density information such as presentation slides projected onto a screen, or whiteboards. In many cases, glare and distance to the regions of interest make it impossible for the viewers to read the displayed information.

Therefore, in view of the above and other short comings of the conventional 360-degree video technology, new and improved systems and methods are needed that would automatically detect and inset high-resolution digital video streams into 360-degree videos making them readable to the users.

SUMMARY OF THE INVENTION

The embodiments described herein are directed to systems and methods that substantially obviate one or more of the above and other problems associated with the conventional systems and methods for 360-degree videos.

In accordance with one aspect of the embodiments described herein, there is provided a system comprising: at least one camera for acquiring a 360-degree video of an environment; and a processing unit for identifying at least one inset candidate within the acquired 360-degree video and insetting a media into the identified at least one inset candidate.

In one or more embodiments, the inset candidate is a region within the 360-degree video.

In one or more embodiments, the region within the 360-degree video is a surface.

In one or more embodiments, the region within the 360-degree video is a display screen.

In one or more embodiments, the region within the 360-degree video is a whiteboard.

In one or more embodiments, the media is an image.

In one or more embodiments, the media is a video stream.

In one or more embodiments, a resolution of the media is higher than the resolution of the 360-degree video.

In one or more embodiments, the inset media is cut based on detected occlusion of the inset candidate.

In one or more embodiments, the inset media is cut using a mask.

In one or more embodiments, the inset candidate is identified using a content of the 360-degree video.

In one or more embodiments, the inset candidate is identified based on a position of the at least one camera in relation to a position of the inset candidate.

In one or more embodiments, the media to be inset into the identified at least one inset candidate is selected based on facial recognition of a person in the 360-degree video located in a proximity of the identified at least one inset candidate.

In one or more embodiments, the inset candidate is identified using object recognition within the 360-degree video.

In one or more embodiments, the inset candidate is additionally identified based on user's input.

In one or more embodiments, the media to be inset into the identified at least one inset candidate is selected based on location of the identified at least one inset candidate within the 360-degree video.

In accordance with another aspect of the embodiments described herein, there is provided a method comprising: using at least one camera for acquiring a 360-degree video of an environment; and using a processing unit for identifying at least one inset candidate within the acquired 360-degree video and insetting a media into the identified at least one inset candidate.

In accordance with yet another aspect of the embodiments described herein, there is provided a tangible computer-readable medium embodying a set of instructions implementing a method comprising: using at least one camera for acquiring a 360-degree video of an environment; and using a processing unit for identifying at least one inset candidate within the acquired 360-degree video and insetting a media into the identified at least one inset candidate.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION

Figure 1:
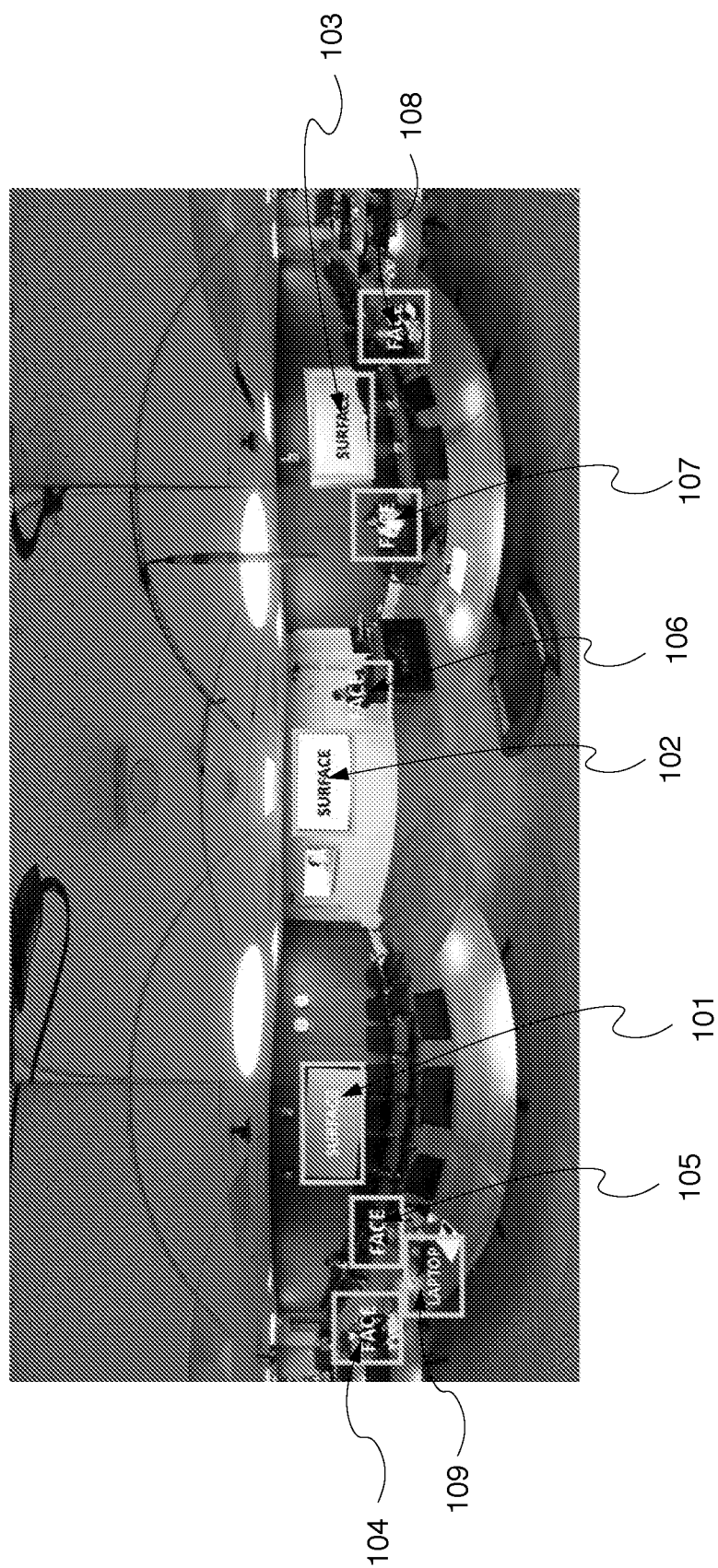
FIG. 1 illustrates an exemplary setting of a 360-degree video.

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

In accordance with one aspect of the embodiments described herein, there are provided systems and methods for automatic detection and insetting of digital streams into a 360 video. Various examples of such regions of interest to the user include, without limitation, content displayed on various electronic displays or written on electronic paper (electronic ink), content projected on various surfaces using electronic projectors, content of paper documents appearing in the 360-degree video and/or content written on white (black) boards inside the 360-degree video. As would be appreciated by persons of ordinary skill in the art, more and more of these regions of interest to the user are "digital born", meaning a computer is driving the display. For some content, such as whiteboards, paper documents or paintings in a museum, a participant (or curator) could have taken pictures of the regions, again stored digitally somewhere and available for download.

In one or more embodiments, these digital streams with content of interest to the user are obtained and then inset onto the 360-degree view generated from the raw 360-degree video feed, giving users the ability to view them at their native high resolution. It should be noted that although this description focuses on 360-degree field of view images, the methods described herein could be applied to other views with less than a full 360-degree panoramic field of view.

In one or more embodiments, in order to achieve this, the described system semi-automatically determines where each digital stream should be inset onto the 360-degree video. To provide a realistic inset, the embodiment of the system further masks the digital stream to prevent masking objects such as people that might move between the 360-degree camera and the regions of interest (e.g. a presenter moves in front of the projected content).

Various embodiments use two methods for finding regions and determining where to place insets: image based, and geometry based. Using the image-based methods, no information is required about the actual placement of the camera or regions—they are simply determined and manipulated by their positions within the images from the 360-degree camera. Alternatively, geometry based methods use the pose of the camera together with positions of regions in the world, to determine their corresponding positions within images. The image-based methods are simpler, and may be adequate for situations where the camera and regions of interest are fixed, such as a permanently placed 360-degree camera and electronic (LCD, LED, plasma) displays in a meeting room.

In another alternative embodiment, the geometry-based methods may be required when the camera moves, regions move, or auxiliary tools such as other cameras or sensors are used to determine positions of regions of interest or of occluding bodies. The aforesaid image based methods, which are particularly oriented towards a meeting room scenario, will be described first and then discussion to geometry-based methods will be provided.

In one or more embodiments, from the 360-degree video feed, the first step extracts a set of candidate surfaces and objects (collectively called "regions of interest") as shown in FIG. 1, which include three surfaces 101, 102 and 103, five faces 104, 105, 106, 107 and 108, and one laptop 109 associated with one of the faces. In various embodiments, the aforesaid automatic detection can use face and person detection and detected blinking screens to determine their corresponding locations in the video.

Figure 2:
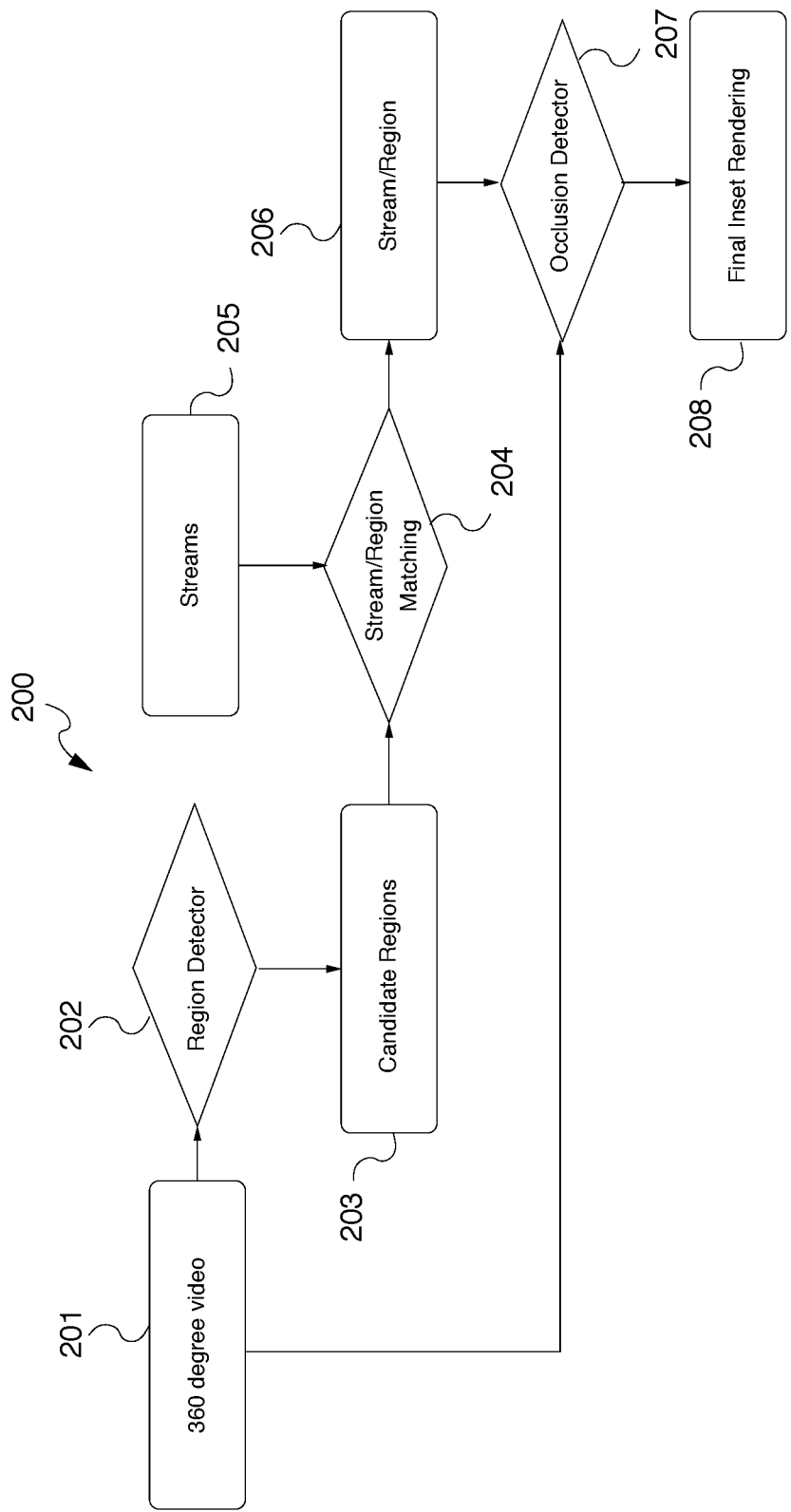
FIG. 2 illustrates an exemplary operating sequence of an embodiment of a system for automatic detection and insetting of digital streams into a 360-degree video described herein.

FIG. 2 illustrates an exemplary operating sequence 200 of an embodiment of a system for automatic detection and insetting of digital streams into a 360-degree video described herein. First, at step 201 the 360-degree video is created using one or multiple cameras. At step 202, regions in the 360-degree video are detected.

At step 203, candidate regions are identified. In various embodiments, a user (either the end user or a "room curator") may be enabled to manually adjust the location of the aforesaid regions of interest at the step 203. It should be noted that for most rooms, the above-described surfaces would not need to be adjusted further as it is unlikely that projector screens or whiteboards get extensively moved. At step 205, the embodiment of the system then gathers a set of digital streams made available to the system, including, without limitation, VNC video stream (Video+Audio, HTML 5 solution) running from a podium computer, an image or live video from a mobile device imaging a whiteboard, a WebRTC (Web Real-Time Communication) stream of a screen being shared during the meeting, along with its participant's name or any other video streams in formats well known in the art.

In various embodiments, using image matching, the system associates the digital streams to the previously identified regions of interest, see step 204, resulting in stream/region pairs 206. Again, end users of the application or system administrators can modify the default mapping that was automatically generated. In FIG. 1 for example, it could be hard to distinguish which whiteboard should be mapped to a digital image of that whiteboard.

Figure 3:
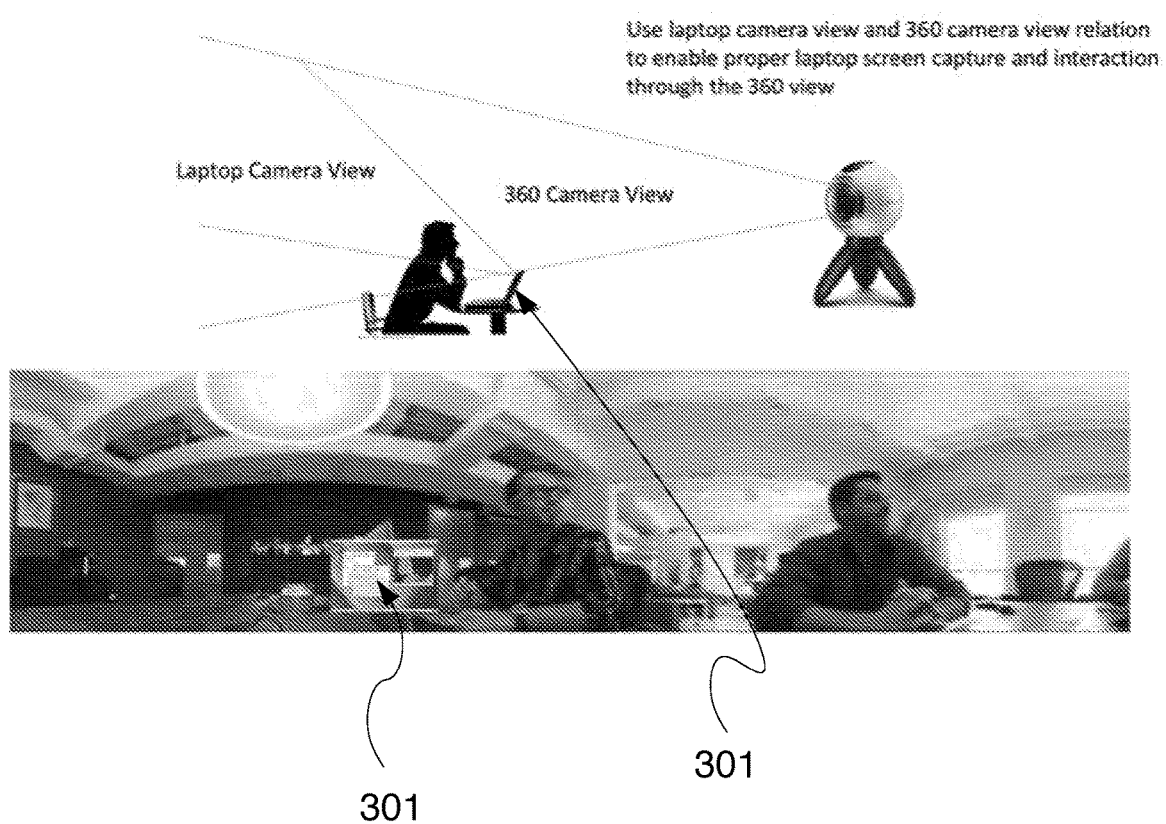
FIG. 3 illustrates certain exemplary regions in the 360-degree video (such as laptop's LCD screen) that are not directly visible to the camera.

Once the position of the regions of interest are found and mapped to a digital stream, the digital streams are added over the 30 rendered of the 360-degree video feed. However, because people in the room might sometimes occlude the region of interest (e.g. a presenter moving in front of the projected content), an embodiment of the system includes an occlusion detector that computes a mask of the digital stream before insetting it onto the final rendering, see step 207. In various embodiments, masking may be done in the following ways:

1. directly by comparing the rectified region of interest with its associated stream, and mask areas with great difference (e.g. FIG. 1, whiteboards)
2. by using Mask R-CNN method described in He, Kaiming, et al. "Mask r-cnn." Computer Vision (ICCV), 2017 IEEE International Conference on. IEEE, 2017, to detect occluding shapes in front of the digital streams. This method is illustrated in FIG. 3, where the laptop stream is rendered over the region of interest detected as a laptop, but where the laptop could disappear if a user moved in front of the laptop during a meeting. In one or more alternative embodiments, other methods could be used in place of the aforesaid Mask R-CNN method, including, without limitation, any object detector that could, for example, determine if there's a person standing; any human pose estimator, which could be used to obtain the same information; or any other semantic segmentation network, such as Deeplab available from Google. Finally, at step 208, the final inset rendering is performed.

It should be noted that some regions might not be visible to the camera, such as a laptop screen shared over the WebRTC during the meeting by a participant: the 360 camera only sees the back of the laptop, as shown in FIG. 3, element 301, making it impossible to compute the mask using image differencing. Instead, in one embodiment, the described system relies on a person detector and segmentation (e.g. Mask R-CNN) to detect that a person is standing in front of a specific region.

In one or more embodiments, if the face detector also has face recognition, the system can inset the shared screen onto the 360-degree video over the laptop closest to the recognized face. In case the faces can't be recognized easily, in one embodiment, the participants can manually assign themselves onto regions, e.g. by clicking on their face in the 360-degree video feed.

The geometry based methods for augmented video will now be described in detail. Another way to determine the regions where insets should be placed, is to determine the world positions and placements of the 360-degree camera, and of the regions of interest. Then the world coordinates of defining the regions, such as vertices of a rectangle, can be projected into image coordinates. This may be necessary in situations where the camera or objects within the scene are moving, or when other positional sources of information are used to provide information for masking. For example, a Kinect system, well known in the art and widely commercially available, with a skeleton tracker can determine whether a presenter is standing in front of a display. If the Kinect is placed very close to the 360-degree camera, image based methods may be adequate, but if the Kinects are at other locations the world positions of the tracked presenter must be projected into the 360-degree image coordinates to determine if there is occlusion. This could also be used when some tracking technology such as structured coded light, is used to determine positions of devices such as laptops.

In the case when the camera is moving, the camera position could be determined by identifying the positions of fiducial points in the world, such as on placed QR codes, well known in the art, or at landmark points on registered images. This can be done in real time. For some applications such as virtual recorded tours of museums, the camera poses could be determined by structure from motion methods, such as provided in OpenSFM, well known in the art, which don't run in real time.

Exemplary Embodiment of a Computer System

Figure 4:
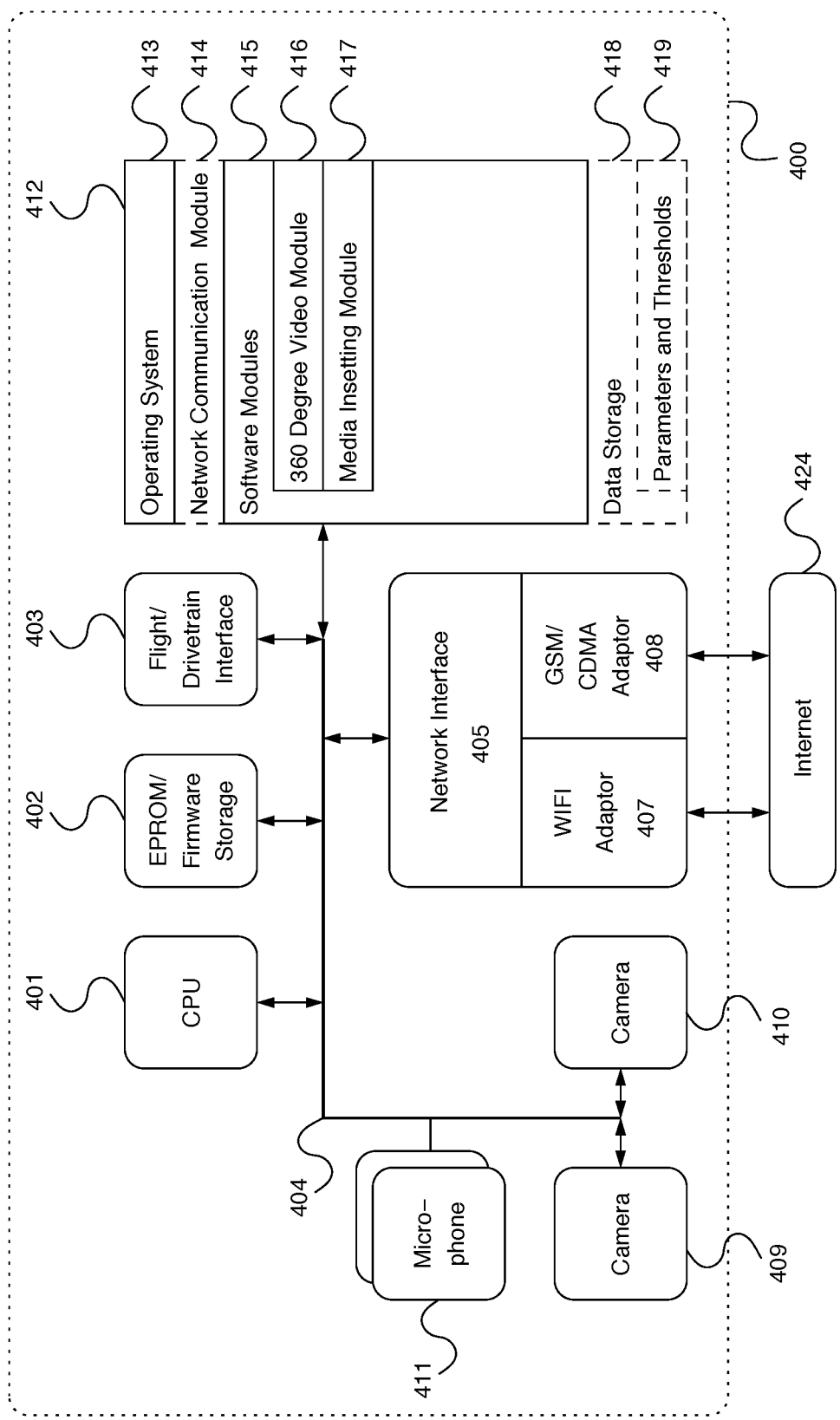
FIG. 4 illustrates an exemplary embodiment of a computer system 400, which may be used to implement the techniques described herein.

FIG. 4 illustrates an exemplary embodiment of a computer system 400, which may be used to implement the techniques described herein. In one or more embodiments, the computer 400 may be implemented within the form factor of a mobile computing device well known to persons of skill in the art. In an alternative embodiment, the computer 400 may be implemented based on a laptop or a notebook computer. Yet in an alternative embodiment, the computer 400 may be a specialized computing system.

The computer 400 may include a data bus 404 or other interconnect or communication mechanism for communicating information across and among various hardware components of the computer 400, and a central processing unit (CPU or simply processor) 401 coupled with the data bus 404 for processing information and performing other computational and control tasks. The computer 400 also includes a memory 412, such as a random access memory (RAM) or other dynamic storage device, coupled to the data bus 404 for storing various information as well as instructions to be executed by the processor 401. The memory 412 may also include persistent storage devices, such as a magnetic disk, optical disk, solid-state flash memory device or other non-volatile solid-state storage devices.

In one or more embodiments, the memory 412 may also be used for storing temporary variables or other intermediate information during execution of instructions by the processor 401. Optionally, computer 400 may further include a read only memory (ROM or EPROM) 402 or other static storage device coupled to the data bus 404 for storing static information and instructions for the processor 401, such as firmware necessary for the operation of the computer 400, basic input-output system (BIOS), as well as various configuration parameters of the computer 400.

In one or more embodiments, the computer 400 may additionally incorporate two or more cameras 409 and 410 for generating the 360-degree video. In addition, the computer 400 may incorporate multiple microphones 411 for picking up the audio associated with the captured 360-degree video.

In one or more embodiments, the computer 400 may additionally include a communication interface, such as a network interface 405 coupled to the data bus 404. The network interface 405 may be configured to establish a connection between the computer 400 and the Internet 424 using at least one of WIFI interface 407 and the cellular network (GSM or CDMA) adaptor 408. The network interface 405 may be configured to provide a two-way data communication between the computer 400 and the Internet 424. The WIFI interface 407 may operate in compliance with 802.11a, b, 802.11g and/or 802.11n protocols as well as Bluetooth protocol well known to persons of ordinary skill in the art. In an exemplary implementation, the WIFI interface 407 and the cellular network (GSM or CDMA) adaptor 408 send and receive electrical or electromagnetic signals that carry digital data streams representing various types of information.

In one or more embodiments, the Internet 424 typically provides data communication through one or more sub-networks to other network resources. Thus, the computer 400 is capable of accessing a variety of network resources located anywhere on the Internet 424, such as remote media servers, web servers, other content servers as well as other network data storage resources. In one or more embodiments, the computer 400 is configured send and receive messages, media and other data, including application program code, through a variety of network(s) including Internet 424 by means of the network interface 405. In the Internet example, when the computer 400 acts as a network client, it may request code or data for an application program executing in the computer 400. Similarly, it may send various data or computer code to other network resources.

In one or more embodiments, the functionality described herein is implemented by the computer 400 in response to processor 401 executing one or more sequences of one or more instructions contained in the memory 412. Such instructions may be read into the memory 412 from another computer-readable medium. Execution of the sequences of instructions contained in the memory 412 causes the processor 401 to perform the various process steps described herein. In alternative embodiments, hard-wired circuitry may be used in place of or in combination with software instructions to implement the embodiments of the invention. Thus, embodiments of the invention are not limited to any specific combination of hardware circuitry and software.

The term "computer-readable medium" as used herein refers to any medium that participates in providing instructions to processor 401 for execution. The computer-readable medium is just one example of a machine-readable medium, which may carry instructions for implementing any of the methods and/or techniques described herein. Such a medium may take many forms, including but not limited to, non-volatile media and volatile media.

Common forms of non-transitory computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, or any other medium from which a computer can read. Various forms of computer readable media may be involved in carrying one or more sequences of one or more instructions to processor 401 for execution. For example, the instructions may initially be carried on a magnetic disk from a remote computer. Alternatively, a remote computer can load the instructions into its dynamic memory and send the instructions over the Internet 424. Specifically, the computer instructions may be downloaded into the memory 412 of the computer 400 from the foresaid remote computer via the Internet 424 using a variety of network data communication protocols well known in the art.

In one or more embodiments, the memory 412 of the computer 400 may store any of the following software programs, applications and/or modules:

1. Operating system (OS) 413, which may be a mobile operating system for implementing basic system services and managing various hardware components of the computer 400. Exemplary embodiments of the operating system 413 are well known to persons of skill in the art, and may include any now known or later developed mobile operating systems. Additionally provided may be a network communication module 414 for enabling network communications using the network interface 405.

2. Software modules 415 may include, for example, a set of software modules executed by the processor 401 of the computer 400, which cause the computer 400 to perform certain predetermined functions, such as record 360-degree video using the cameras 409 and 410 (module 416) and perform automatic detection and insetting of digital streams into a 360-degree video (module 417).

3. Data storage 418 may be used, for example, for storing various parameters and thresholds 419.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, Objective-C, perl, shell, PHP, Java, as well as any now known or later developed programming or scripting language.

Moreover, other implementations of the invention will be apparent to those skilled in the art from consideration of the specification and practice of the invention disclosed herein. Various aspects and/or components of the described embodiments may be used singly or in any combination in the systems and methods for automatic detection and insetting of digital streams into a 360-degree video. It is intended that the specification and examples be considered as exemplary only, with a true scope and spirit of the invention being indicated by the following claims.

What is claimed is:

1. A system comprising:
   at least one camera for acquiring a video of an environment which includes objects comprising surfaces, including at least one surface where a first digital media content is displayed; and
   at least one processor executing instruction stored in a memory to:
   detect the surfaces from the video using object recognition;
   identify one or more surfaces, of the detected surfaces, within the video as one or more inset candidate regions; and
   inset a second digital media content into the identified one or more inset candidate regions, the second digital media content representative of the first digital media content.

2. The system of claim 1, wherein the one or more surfaces identified as one or more inset candidate regions within the video is a display screen.

3. The system of claim 1, wherein the one or more surfaces identified as one or more inset candidate regions within the video is a whiteboard.

4. The system of claim 1, wherein the first and second digital media content is an image.

5. The system of claim 1, wherein the first and second digital media content is a video stream.

6. The system of claim 1, wherein a resolution of the second digital media content is higher than the resolution of the video.

7. The system of claim 1, wherein the at least one processor executes the instruction to:
   detect an occlusion of the identified one or more inset candidate regions by an object between the one or more surfaces identified as the insert candidate regions and the at least one camera; and cut the inset second digital media content based on the detected occlusion.

8. The system of claim 7, wherein the at least one processor executes the instruction to:
compute a mask based on the detected occlusion; and
cut the inset second digital media content using the mask.

9. The system of claim 1, wherein the one or more inset candidate regions are identified based on a position of the at least one camera in relation to a position of the inset candidate region.

10. The system of claim 1, wherein the one or more inset candidate regions are additionally identified based on an input.

11. The system of claim 1, wherein the second digital media content to be inset into the identified one or more inset candidate regions is selected based on location of the one or more surfaces identified as the one or more inset candidate regions within the video.

12. The system of claim 1, wherein the at least one camera and the identified one or more surfaces are fixed.

13. The system of claim 1, wherein the one or more inset candidate regions are manually adjustable.

14. The system of claim 1, wherein the at least one processor executes the instruction to identify a plurality of surfaces, of the detected surfaces, within the video as a plurality of inset candidate regions and select at least one digital media content to be inset into each of the plurality of inset candidate regions.

15. A method comprising:
acquiring a video of an environment includes objects comprising surfaces, including at least one surface where a first digital media content is displayed, using at least one camera;
detecting the surfaces from the video using object recognition;
identifying one or more surfaces, of the detected surfaces, within the video as one or more inset candidate regions; and
insetting a second digital media content into the identified one or more inset candidate regions, the second digital media content representative of the first digital media content.

16. The method of claim 15, wherein the at least one camera and the identified one or more surfaces are fixed.

17. The method of claim 15, wherein the one or more inset candidate regions are manually adjustable.

18. A non-transitory computer-readable medium embodying a set of instructions implementing a method comprising:
acquiring a video of an environment includes objects comprising surfaces, including at least one surface where a first digital media content is displayed, using at least one camera;
detecting the surfaces from the video using object recognition;
identifying one or more surfaces, of the detected surfaces, within the video as one or more inset candidate regions; and
insetting a second digital media content into the identified one or more inset candidate regions, the second digital media content representative of the first digital media content.

19. The non-transitory computer-readable medium of claim 18, wherein the at least one camera and the identified one or more surfaces are fixed.

20. The non-transitory computer-readable medium of claim 18, wherein the one or more inset candidate regions are manually adjustable.

* * * * *